United States Patent
Nishiyama et al.

(10) Patent No.: US 10,167,401 B2
(45) Date of Patent: Jan. 1, 2019

(54) IMAGE FORMING METHOD

(71) Applicant: KONICA MINOLTA, INC., Tokyo (JP)

(72) Inventors: Hiromichi Nishiyama, Tokyo (JP); Yusuke Takaku, Tokyo (JP); Shogo Watanabe, Tokyo (JP); Yuka Yazaki, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/878,474

(22) Filed: Jan. 24, 2018

(65) Prior Publication Data

US 2018/0215938 A1 Aug. 2, 2018

(30) Foreign Application Priority Data

Jan. 27, 2017 (JP) .................. 2017-013029

(51) Int. Cl.
*B41J 2/01* (2006.01)
*B41M 7/00* (2006.01)
(Continued)

(52) U.S. Cl.
CPC .............. *C09D 11/38* (2013.01); *B41J 2/01* (2013.01); *B41M 7/00* (2013.01); *B41M 7/0081* (2013.01);
(Continued)

(58) Field of Classification Search
CPC ....... C09D 11/38; C09D 11/34; C09D 11/101; C09D 11/03; C09D 11/322; B41M 7/00; B41M 7/0081; B41J 2/01
See application file for complete search history.

(56) References Cited

U.S. PATENT DOCUMENTS

| 2015/0070451 | A1* | 3/2015 | Ikeda | ................. B41J 2/155 347/102 |
|---|---|---|---|---|
| 2017/0009094 | A1 | 1/2017 | Miyano | |
| 2017/0275481 | A1 | 9/2017 | Van Hout | |

FOREIGN PATENT DOCUMENTS

| EP | 3115425 A1 | 6/2016 |
|---|---|---|
| JP | 2010017710 A | 1/2010 |

(Continued)

OTHER PUBLICATIONS

IP.com search (Year: 2018).*
Extended European Search Report dated Apr. 6, 2018 from corresponding European Application No. 18153776.2.

*Primary Examiner* — Lisa Solomon
(74) *Attorney, Agent, or Firm* — Lucas & Mercanti, LLP

(57) ABSTRACT

The present invention provides an image forming method capable of suppressing glossiness unevenness in one image with curability of an ink droplet having been caused to land on a recording medium increased. The image forming method includes: preparing an actinic radiation-curable inkjet ink containing a radical polymerizable compound, a photopolymerization initiator, a gelling agent, and a nucleating agent; discharging a droplet of the actinic radiation-curable inkjet ink to cause the droplet to land on a surface of a recording medium; and curing the droplet by irradiating the droplet having been caused to land on the recording medium with actinic radiation. The gelling agent contains, in a molecular structure thereof, a polar group, and a $C_{15\text{-}26}$ alkyl group, the nucleating agent is a (poly)glycerin fatty acid ester, and an oxygen concentration in an atmosphere where irradiation with the actinic radiation is conducted is less than 20 vol %.

4 Claims, 2 Drawing Sheets

(51) Int. Cl.
*C09D 11/03* (2014.01)
*C09D 11/34* (2014.01)
*C09D 11/101* (2014.01)
*C09D 11/322* (2014.01)
*C09D 11/38* (2014.01)

(52) U.S. Cl.
CPC ............ *C09D 11/03* (2013.01); *C09D 11/101* (2013.01); *C09D 11/322* (2013.01); *C09D 11/34* (2013.01)

(56) References Cited

FOREIGN PATENT DOCUMENTS

| | | |
|---|---|---|
| JP | 2014159114 A | 9/2014 |
| WO | 2016/097180 A1 | 6/2016 |
| WO | 2017/126439 A1 | 7/2017 |

* cited by examiner

IMAGE FORMING METHOD

CROSS REFERENCE TO RELATED APPLICATIONS

Japanese Patent Application No. 2017-013029 filed on Jan. 27, 2017, including description, claims, drawings, and abstract the entire disclosure is incorporated herein by reference in its entirety.

BACKGROUND

Technological Field

The present invention relates to an image forming method.

Description of Related Art

An inkjet recording method is employed in various fields of printing because images can be simply and inexpensively formed by this method. As one type of inkjet inks, an ink cured through irradiation with actinic radiation is known. Such an actinic radiation-curable ink usually contains an actinic radiation-curable compound and a photopolymerization initiator. When an image is formed by using the actinic radiation-curable ink, a droplet of the ink is caused to land on a surface of a recording medium, and the droplet thus caused to land is irradiated with actinic radiation. Thus, a cured product (a cured film) of the droplet is formed on the surface of the recording medium, so as to form a desired image. When an image forming method using the actinic radiation-curable ink is employed, an image having high adhesiveness can be formed regardless of the water absorbency of a recording medium, and hence, the image forming method is regarded promising.

As one type of the actinic radiation-curable ink, an ink that contains a gelling agent to reversibly undergo sol-gel phase transition through temperature change (hereinafter sometimes simply referred to as a "gel ink") has been developed. A gel ink is in a sol state when heated and is in a gel state at a low temperature. Such a gel ink is in a sol state when discharged from a nozzle of an inkjet head, and is cooled to undergo gelation when it lands on a surface of a recording medium. Then, the gel ink thus pinned on the surface of the recording medium is irradiated with actinic radiation to cure the gel ink, and thus, an image is formed.

Here, it is known that an oxygen concentration is adjusted in irradiating a droplet of a gel ink with the actinic radiation (see, for example, Japanese Patent Application Laid-Open No. 2010-17710). According to this literature, a gel ink is cured while the oxygen concentration is adjusted, so as to adjust glossiness of an image to be formed.

On the other hand, it is also known that the oxygen concentration is adjusted also in curing an actinic radiation-curable ink other than the gel ink (see, for example, Japanese Patent Application Laid-Open No. 2014-159114). Here, a radical polymerizable compound and a cationic polymerizable compound are used as an actinic radiation-curable compound in many of actinic radiation-curable inks, and it is known that polymerization of a radical polymerizable compound is easily inhibited by oxygen. Therefore, in this literature, the inhibition of the polymerization by oxygen is suppressed by reducing an amount of oxygen present around the ink (an oxygen concentration or an oxygen partial pressure) at the time of the irradiation with the actinic radiation, and thus, hardness reduction of a cured film, degradation of abrasion resistance, occurrence of blocking and the like are suppressed.

SUMMARY

Here, a gelling agent contained in a gel ink is crystallized when the ink lands on a surface of a recording medium. At this point, the temperature is easily lowered on the surface of a droplet although the temperature is difficult to lower inside the droplet. Therefore, in a conventional gel ink, unevenness is easily caused in size of crystals formed within a droplet, which easily causes irregularities on the surface of a cured product of the droplet. Besides, when, for example, the temperature is uneven on the recording medium, or the temperature is uneven an environment where the ink is discharged, a difference is easily caused in size of crystal among respective droplets included in one and the same image. Such crystal unevenness of the gelling agent is easily visually recognized as glossiness unevenness.

Besides, particularly when a droplet of a gel ink is cured with the oxygen concentration lowered as described in Japanese Patent Application Laid-Open Nos. 2010-17710 and 2014-159114, the glossiness unevenness in one image is very conspicuous. This is probably for the reason described below.

As a method for conducting irradiation with the actinic radiation in a region where the oxygen concentration is lowered, for example, a method in which irradiation with the actinic radiation is conducted while an inert gas such as a nitrogen gas is being blown against a recording medium, or a method in which irradiation with the actinic radiation is conducted in an atmosphere filled with an inert gas is employed. In either of these methods, however, it is difficult to make the oxygen concentration uniform in the whole region irradiated with the actinic radiation, and a region having a high oxygen concentration and a region having a low oxygen concentration are unavoidably formed. When a droplet of the actinic radiation-curable inkjet ink is cured under such an environment, a region where the inhibition by oxygen is not caused and hence high curability can be attained and a region where the inhibition by oxygen is caused and hence merely low curability can be attained are unavoidably formed. Such variation in the cured state between the regions is visually recognized as the glossiness unevenness in one image. In other words, when a gel ink is cured with the oxygen concentration lowered, glossiness unevenness derived from uneven oxygen concentration and glossiness unevenness derived from the crystal unevenness of the gelling agent are both caused, and this is probably because the glossiness unevenness is very conspicuous.

Accordingly, in a conventional image forming method, it is difficult to suppress the glossiness unevenness in one image with an ink sufficiently cured with the oxygen concentration lowered at the time of curing. The present invention was devised in consideration of this problem. Specifically, an object of the present invention to provide an image forming method in which glossiness unevenness in one image can be suppressed while curability of an ink droplet caused to land on a recording medium is increased.

To achieve at least one of the abovementioned objects, an image forming method reflecting one aspect of the present invention includes: preparing an actinic radiation-curable inkjet ink containing a radical polymerizable compound, a photopolymerization initiator, a gelling agent, and a nucleating agent; discharging, from a nozzle of an inkjet head, a droplet of the actinic radiation-curable inkjet ink to cause the droplet to land on a surface of a recording medium; and curing the droplet by irradiating the droplet having been caused to land on the recording medium with actinic radiation, in which the gelling agent contains, in a molecular structure thereof, a polar group, and a $C_{15-26}$ alkyl group, the nucleating agent is a (poly)glycerin fatty acid ester, and an oxygen concentration in an atmosphere where irradiation with the actinic radiation is conducted is less than 20 vol %.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
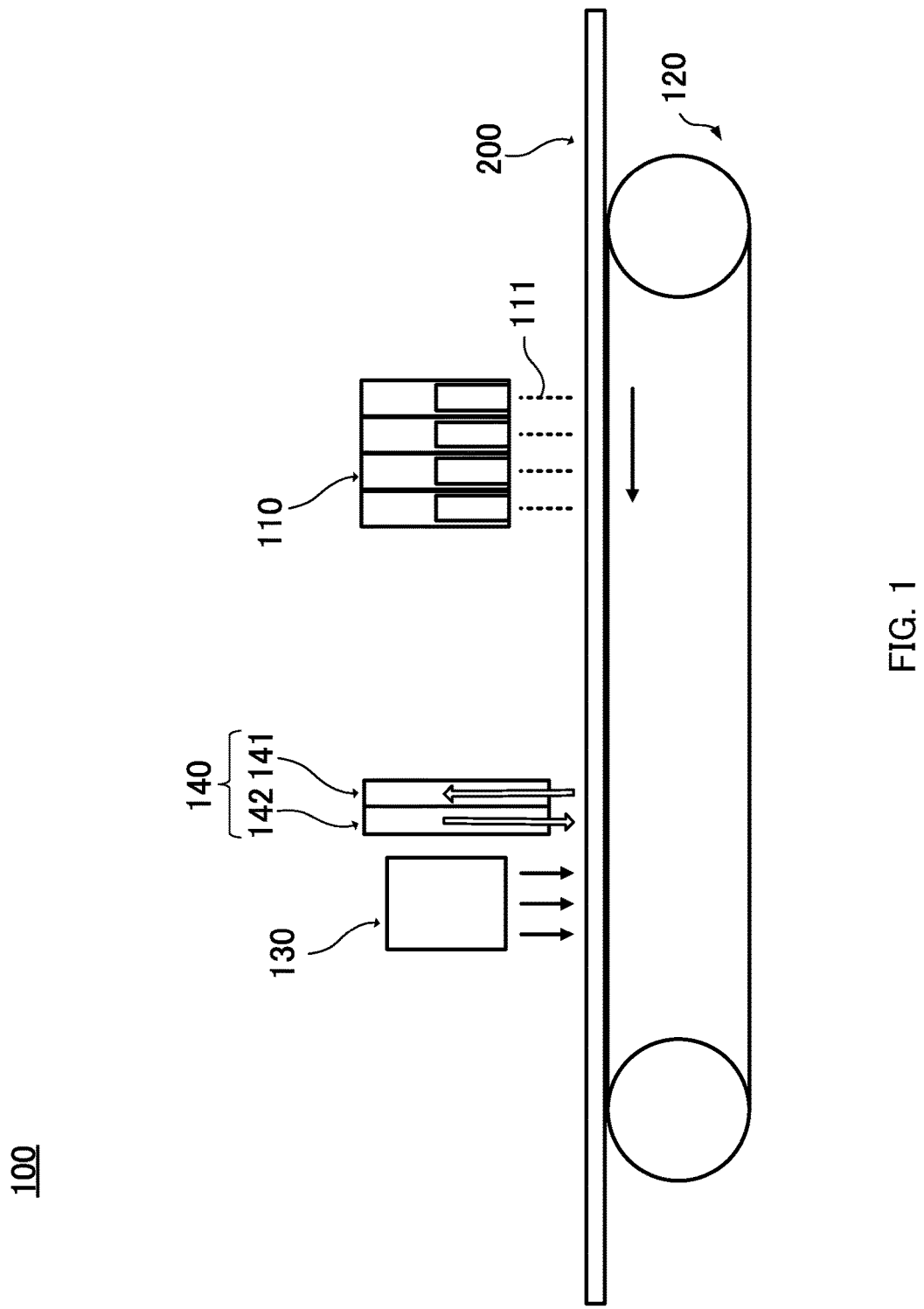
FIG. 1 is a side view illustrating an example of an image forming apparatus to be used for performing an image forming method of the present invention.

Hereinafter, one or more embodiments of the present invention will be described with reference to the drawings. However, the scope of the invention is not limited to the disclosed embodiments.

An image forming method of the present invention includes: a step of preparing an actinic radiation-curable inkjet ink containing a radical polymerizable compound, a photopolymerization initiator, a gelling agent and a nucleating agent (hereinafter also referred to as the "first step"); a step of discharging a droplet of the actinic radiation-curable inkjet ink from a nozzle of an inkjet head to cause the droplet to land on a surface of a recording medium (hereinafter also referred to as the "second step"); and a step of curing the droplet by irradiating the droplet having been caused to land on the recording medium with actinic radiation in an environment where an oxygen concentration is less than 20 vol % (hereinafter also referred to as the "third step").

As described above, in a conventional image forming method, when an oxygen concentration at the time of irradiation with actinic radiation is lowered to increase the curability of a radical polymerizable gel ink, glossiness unevenness derived from uneven oxygen concentration and glossiness unevenness derived from crystal unevenness of a gelling agent are both caused, and hence glossiness unevenness is liable to be conspicuous in one image.

On the contrary, according to the present invention, an image is formed by using the actinic radiation-curable inkjet ink containing a gelling agent having a specific structure and a nucleating agent containing a (poly)glycerin fatty acid ester. The gelling agent and the nucleating agent have high affinity for each other. Therefore, when the actinic radiation-curable inkjet ink is caused to land on a recording medium, the gelling agent forms, within a droplet, uniformly fine crystals with the nucleating agent used as a nucleus. The crystallinity of the gelling agent is difficult to be affected by the temperature unevenness of the recording medium or the temperature unevenness in an environment where the ink is discharged. In other words, in the image forming method using the actinic radiation-curable inkjet ink, the crystal unevenness of the gelling agent is difficult to occur. Accordingly, even if the oxygen concentration is uneven at the time of the irradiation with the actinic radiation, the glossiness unevenness derived from the crystal unevenness of the gelling agent is eliminated, and hence the glossiness unevenness in one image is not liable to be conspicuous.

Incidentally, if uniformly fine crystals are formed within a droplet of the ink with the nucleating agent used as a nucleus, irregularities are difficult to be formed on the surface of each droplet. Therefore, according to the image forming method of the present invention, an effect to reduce granularity of an image to be formed can be also attained.

The respective steps of the image forming method of the present invention will now be described.

1. First Step

In the first step, an actinic radiation-curable inkjet ink is prepared. The actinic radiation-curable inkjet ink prepared in this step contains at least a radical polymerizable compound, a photopolymerization initiator, a gelling agent and a nucleating agent. The actinic radiation-curable inkjet ink may contain other components such as a colorant and various additives, if necessary.

(Radical Polymerizable Compound)

The radical polymerizable compound is a compound radically polymerized through irradiation with actinic radiation. The actinic radiation is, for example, electron beams, ultraviolet rays, α-rays, γ-rays, X-rays and the like, is preferably ultraviolet rays or electron beams.

The radical polymerizable compound may be a compound having two or more radically polymerizable functional groups, or may be a compound having merely one radically polymerizable functional group. Here, the actinic radiation-curable inkjet ink may contain merely one radically polymerizable compound or two or more of radically polymerizable compounds.

Examples of the radical polymerizable compound include unsaturated carboxylic acids and salts thereof, unsaturated carboxylate compounds, unsaturated carboxylic acid urethane compounds, unsaturated carboxylic acid amide compounds and anhydrides thereof, acrylonitrile, styrene, unsaturated polyester, unsaturated polyether, unsaturated polyamide, and unsaturated urethane. Examples of the unsaturated carboxylic acids include (meth)acrylic acid, itaconic acid, crotonic acid, isocrotonic acid, and maleic acid. From the viewpoint of polymerizability and the like, the radical polymerizable compound is preferably an unsaturated carboxylate compound, and is more preferably (meth)acrylate among the above-described examples. It is noted that the term "(meth)acryl" as used herein means acrylic and/or methacrylic, and that the term "(meth)acrylate" as used herein means acrylate and methacrylate.

Examples of the (meth)acrylate include: monofunctional (meth)acrylates such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl succinate, 2-(meth)acryloyloxyethyl phthalate, 2-(meth)acryloyloxyethyl-2-hydroxyethyl-phthalic acid, and t-butylcyclohexyl (meth)acrylate; difunctional (meth)acrylates such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, di(meth)acrylate having bisphenol A structure, neopentyl glycol hydroxypivalate di(meth)acrylate, polytetramethylene glycol di(meth)acrylate, and tripropylene glycol di(meth)acrylate; tri- or higher-functional (meth)acrylates such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate; an oligomer having a (meth)acryloyl group such as a polyester acrylate oligomer; and modified products of these. Examples of the modified products of the (meth)acrylates include an ethylene oxide-modified (EO-modified) acrylate in which an ethylene oxide group is inserted, and a propylene oxide-modified (PO-modified) acrylate in which propylene oxide is inserted.

Alternatively, the radical polymerizable compound may be an oligomer obtained by polymerizing any of the above-described (meth)acrylates and a compound having another functional group. Examples of such an oligomer include an epoxy (meth)acrylate oligomer, an aliphatic urethane (meth)acrylate oligomer, an aromatic urethane (meth)acrylate oligomer, and a polyester (meth)acrylate oligomer.

A content of the radical polymerizable compound in the actinic radiation-curable inkjet ink is preferably 1 to 97 mass %, and more preferably 30 to 95 mass %. If the amount of the radical polymerizable compound falls in this range, the film strength of an image to be formed is increased.

(Photopolymerization Initiator)

As the photopolymerization initiator contained in the actinic radiation-curable inkjet ink, a radical photopolymerization initiator is used.

The radical photopolymerization initiator includes an intramolecular bond cleavage type and an intramolecular hydrogen abstraction type. Examples of the intramolecular bond cleavage type photopolymerization initiator include: acetophenone-based photopolymerization initiators such as diethoxyacetophenone, 2-hydroxy-2-methyl-l-phenylpropan-l-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone; photopolymerization initiators of benzoins such as benzoin, benzoin methyl ether, and benzoin isopropyl ether; acylphosphine-based photopolymerization initiators such as 2,4,6-trimethylbenzoin diphenylphosphine oxide; and benzyl and methyl phenyl glyoxy ester.

Examples of the intramolecular hydrogen abstraction type photopolymerization initiator include: benzophenone-based photopolymerization initiators such as benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone; thioxanthone-based photopolymerization initiators such as 2-isopropylthioxanthone, 2,4-dimethylthioxanthone, 2,4-diethylthioxanthone, and 2,4-dichlorothioxanthone; aminobenzophenone-based photopolymerization initiators such as Michler's ketone, and 4,4'-diethylaminobenzophenone; 10-butyl-2-chloroacridone; 2-ethylanthraquinone; 9,10-phenanthrenequinone; and camphoroquinone.

A content of the photopolymerization initiator in the actinic radiation-curable inkjet ink depends on the type of the actinic radiation to be used for the irradiation and the type of the radical polymerizable compound to be used, and is preferably 0.01 mass % to 10 mass %.

The actinic radiation-curable inkjet ink may contain, together with the photopolymerization initiator, a photopolymerization initiator auxiliary agent. Examples of the photopolymerization initiator auxiliary agent include tertiary amine compounds, among which an aromatic tertiary amine compound is particularly preferred. Examples of the aromatic tertiary amine compound include N,N-dimethylaniline, N,N-diethylaniline, N,N-dimethyl-p-toluidine, ethyl N,N-dimethylamino-p-benzoate, isoamylethyl N,N-dimethylamino-p-benzoate, N,N-dihydroxyethyl aniline, triethylamine and N,N-dimethylhexylamine. Among these, ethyl N,N-dimethylamino-p-benzoate and isoamylethyl N,N-dimethylamino-p-benzoate are preferably used. The actinic radiation-curable inkjet ink may contain merely one of these photopolymerization initiator auxiliary agents, or two or more of these.

(Gelling Agent)

The gelling agent is a compound that is in a solid state at normal temperature and is liquefied when heated. Here, from the viewpoint of easily controlling discharge of the solated actinic radiation-curable inkjet ink and the pinning property of the ink having landed on a recording medium, the gelling agent has a melting point of preferably 30° C. or more and less than 150° C.

Besides, the gelling agent may be a compound that uniformly forms a fine crystal structure with the nucleating agent described later used as a nucleus when the actinic radiation-curable inkjet ink lands on a recording medium. Particularly, the gelling agent is more preferably a compound crystallizing in a plate shape at a temperature equal to or lower than a gelling temperature of the actinic radiation-curable inkjet ink to form a structure in which at least a part of the radical polymerizable compound is embraced in a three-dimensional space thus formed by the gelling agent (which structure will be hereinafter also referred to as the "card house structure"). When the card house structure is formed by the gelling agent within a droplet of the actinic radiation-curable inkjet ink immediately after landing on a recording medium, wet-spreading of the droplet having landed on the recording medium is difficult to occur, and hence the pinning property of the droplet is easily improved. When the pinning property of the droplet is improved, droplets having landed on the recording medium are difficult to combine with one another, and hence, a high resolution image can be easily formed.

In order to form the card house structure, the radical polymerizable compound and the gelling agent are preferably compatible each other in the actinic radiation-curable inkjet ink. If the radical polymerizable compound and the gelling agent are separated in phase in the actinic radiation-curable inkjet ink, the card house structure is difficult to form in some cases. Besides, if the radical polymerizable compound and the gelling agent are compatible with each other, the gelling agent is easily crystallized within a droplet. Therefore, the gelling agent is difficult to precipitate on the surface of the droplet.

Here, the gelling agent contains, in a molecular structure thereof, a polar group and a saturated or unsaturated $C_{15-26}$ alkyl group. The polar group contained in the gelling agent is not especially limited, and examples include a carbonyl group, an ester group, a carboxyl group, a hydroxy group and an amide group. Besides, the gelling agent may contain merely one, or two or more saturated or unsaturated $C_{15-26}$ alkyl groups. Incidentally, the gelling agent may contain, in the molecular structure thereof, an alkyl group having 14 or less, or 27 or more carbon atoms. Besides, a substituent may be bonded to part of the alkyl group.

Examples of the gelling agent having such a structure include aliphatic ketone compounds, aliphatic ester compounds, higher fatty acids, higher alcohols, and fatty acid amides. Specific examples of these compounds include the following, but it is noted that the gelling agent is not limited to these compounds.

Examples of the aliphatic ketone compounds include dilignoceryl ketone, dibehenyl ketone, distearyl ketone, dieicosyl ketone, dipalmityl ketone, myristyl palmityl ketone, palmityl stearyl ketone, myristyl behenyl ketone, palmityl behenyl ketone, and stearyl behenyl ketone.

Examples of a commercially available product of the aliphatic ketone compounds include 18-Pentatriacontanon, manufactured by Alfa Aesar, Hentriacontan-16-on, manufactured by Alfa Aesar, and Kao Wax T1, manufactured by Kao Corporation ("Kao Wax" being their registered trademark).

Examples of the aliphatic ester compounds include behenyl behenate, icosyl icosanoate, stearyl stearate, palmityl stearate, lauryl stearate, cetyl palmitate, cetyl myristate, octyldodecyl myristate, oleyl palmitate, stearyl oleate, stearyl erucate, stearyl linoleate, behenyl oleate, and arachidyl linoleate.

Examples of a commercially available product of the aliphatic ester compounds include EMALEX series such as EMALEX CC-18 and EMALEX CC-10, manufactured by Nihon Emulsion Co., Ltd. ("EMALEX" being their registered trademark); RIKEMAL series and POEM series, manufactured by Riken Vitamin Co., Ltd. (both "RIKEMAL" and "POEM" being their registered trademarks); UNISTER M-2222SL and SPERMACETI, manufactured by NOF Corporation ("UNISTER" being their registered trademark); Exepearl SS and Exepearl MY-M, manufactured by Kao Corporation ("Exepearl" being their registered trademark); and AMREPS PC, manufactured by Kokyu Alcohol Kogyo Co., Ltd. ("AMREPS" being their registered trademark). Many of these commercially available products are mixtures of two or more components, and hence, they may be separated and refined if necessary before the addition to the actinic radiation-curable inkjet ink.

Examples of the higher fatty acids include behenic acid, arachidic acid, stearic acid, palmitic acid, oleic acid and erucic acid.

Examples of the higher alcohols include stearyl alcohol and behenyl alcohol.

Examples of the fatty acid amides include stearic acid amide, behenic acid amide, oleic acid amide, erucic acid amide, ricinoleic acid amide, and 12-hydroxystearic acid amide.

Examples of a commercially available product of the fatty acid amides include NIKKAMIDE series, manufactured by Nihon Kasei Chemical Co., Ltd. ("NIKKAMIDE" being their registered trademark), ITOWAX series, manufactured by Itoh Oil Chemicals Co., Ltd., and FATTY AMID series, manufactured by Kao Corporation.

Alternatively, the fatty acid amide may be a N-substituted fatty acid amide or a special fatty acid amide. Examples of the N-substituted fatty acid amide include N-stearyl stearic acid amide, and N-oleyl palmitic acid amide. Examples of the special fatty acid amide include N,N'-ethylenebis stearyl amide, N,N'-ethylenebis-12-hydroxy stearyl amide, and N,N'-xylylenebis stearyl amide.

A content of the gelling agent is preferably 1.0 mass % or more and 10.0 mass % or less with respect to a total mass of the actinic radiation-curable inkjet ink. If the content of the gelling agent is 1.0 mass % or more, the pinning property of the actinic radiation-curable inkjet ink is easily sufficiently improved. On the other hand, if the content of the gelling agent is 10.0 mass % or less, the gelling agent is difficult to precipitate on the surface of a cured product (an image). Besides, if the amount of the gelling agent falls in this range, an ink discharging property from an inkjet head can be improved. The content of the gelling agent in the actinic radiation-curable inkjet ink is more preferably 1.0 mass % or more and 5.0 mass % or less, and further preferably 1.0 mass % or more and 3.0 mass % or less.

(Nucleating Agent)

The nucleating agent is a compound for accelerating the crystallization of the gelling agent within an ink droplet, and contains a (poly)glycerin fatty acid ester. Herein, the term "(poly)glycerin fatty acid ester" refers to both a glycerin fatty acid ester and a polyglycerin fatty acid ester.

Here, the (poly)glycerin fatty acid ester is not especially limited as long as it is a compound capable of accelerating the crystallization of the gelling agent when an ink droplet lands on a recording medium, and may contain one fatty acid ester, or two fatty acid esters in a molecular structure thereof. Besides, when the nucleating agent is a polyglycerin fatty acid ester, the degree of polymerization of glycerin is not especially limited.

However, a difference between the number of carbon atoms in a linear portion of an alkyl chain contained in the gelling agent and the number of carbon atoms in a linear portion of an alkyl chain contained in the (poly)glycerin fatty acid ester is preferably 2 or less. If the number of carbon atoms in a linear portion of an alkyl chain contained in the gelling agent and the number of carbon atoms in a linear portion of an alkyl chain contained in the (poly)glycerin fatty acid ester are substantially the same, the affinity therebetween becomes high. As a result, the gelling agent is easily uniformly crystallized with the nucleating agent used as a nucleus within the ink droplet having landed on a recording medium. Incidentally, if the actinic radiation-curable inkjet ink contains a plurality of gelling agents, a difference between the number of carbon atoms in a linear portion of an alkyl chain contained in at least one of the gelling agents and the number of carbon atoms in a linear portion of an alkyl chain contained in the (poly)glycerin fatty acid ester is preferably 2 or less.

Specific examples of the (poly)glycerin fatty acid ester include: diglycerin fatty acid esters such as diglycerin monolaurate, diglycerin monopalmirate, diglycerin monopalmitate, diglycerin monostearate, diglycerin monoolate, diglycerin monooleate, diglycerin monobehenate, diglycerin monocaprylate, diglycerin monocaprate, diglycerin monolinolate, diglycerin monorecinolate, diglycerin monoadipate, diglycerin monosebacinate, diglycerin dilaurate, diglycerin dipalmirate, diglycerin dipalmitate, diglycerin distearate, diglycerin diolate, diglycerin dioleate, diglycerin dibehenate, diglycerin dicaprylate, diglycerin dicaprate, diglycerin dilinolate, diglycerin direcinolate, diglycerin diadipate, and diglycerin disebacinate; triglycerin fatty acid esters such as triglycerin monolaurate, triglycerin monopalmirate, triglycerin monopalmitate, triglycerin monostearate, triglycerin monoolate, triglycerin monooleate, triglycerin monobehenate, triglycerin monocaprylate, triglycerin monocaprate, triglycerin monolinolate, triglycerin monorecinolate, triglycerin monoadipate, triglycerin monosebacinate, triglycerin dilaurate, triglycerin dipalmirate, triglycerin palmitate, triglycerin distearate, triglycerin diolate, triglycerin dioleate, triglycerin dibehenate, triglycerin dicaprylate, triglycerin dicaprate, triglycerin dilinolate, triglycerin direcinolate, triglycerin diadipate, and triglycerin disebacinate; tetraglycerin fatty acid esters such as tetraglycerin monolaurate, tetraglycerin monopalmirate, tetraglycerin monopalmitate, tetraglycerin monostearate, tetraglycerin monoolate, tetraglycerin monooleate, tetraglycerin monobehenate, tetraglycerin monocaprylate, tetraglycerin monocaprate, tetraglycerin monolinolate, tetraglycerin monorecinolate, tetraglycerin monoadipate, tetraglycerin monosebacinate, tetraglycerin dilaurate, tetraglycerin dipalmirate, tetraglycerin palmitate, tetraglycerin distearate, tetraglycerin diolate, tetraglycerin dioleate, tetraglycerin dibehenate, tetraglycerin dicaprylate, tetraglycerin dicaprate, tetraglycerin dilinolate, tetraglycerin direcinolate, tetraglycerin diadipate, and tetraglycerin disebacinate; hexaglycerin fatty acid esters such as hexaglycerin monolaurate, hexaglycerin monopalmirate, hexaglycerin monopalmitate, hexaglycerin monostearate, hexaglycerin monoolate, hexaglycerin monooleate, hexaglycerin monobehenate, hexaglycerin monocaprylate, hexaglycerin monocaprate, hexaglycerin monolinolate, hexaglycerin monorecinolate, hexaglycerin monoadipate, hexaglycerin monosebacinate, hexaglycerin dilaurate, hexaglycerin dipalmirate, hexaglycerin palmitate, hexaglycerin distearate, hexaglycerin diolate, hexaglycerin dioleate, hexaglycerin dibehenate, hexaglycerin dicaprylate, hexaglycerin dicaprate, hexaglycerin dilinolate, hexaglycerin direcinolate, hexaglycerin diadipate, and hexaglycerin disebacinate; decaglycerin fatty acid esters such as decaglycerin monolaurate, decaglycerin monopalmirate, decaglycerin monopalmitate, decaglycerin monostearate, decaglycerin monoolate, decaglycerin monooleate, decaglycerin monobehenate, decaglycerin monocaprylate, decaglycerin monocaprate, decaglycerin monolinolate, decaglycerin monorecinolate, decaglycerin monoadipate, decaglycerin monosebacinate, decaglycerin dilaurate, decaglycerin dipalmirate, decaglycerin palmitate, decaglycerin distearate, decaglycerin diolate, decaglycerin dioleate, decaglycerin dibehenate, decaglycerin dicaprylate, decaglycerin dicaprate, decaglycerin dilinolate, decaglycerin direcinolate, decaglycerin diadipate, and decaglycerin disebacinate; and ester-linked products of any of various saturated fatty acids, unsaturated fatty acids, straight-chain fatty acids, and branched-chain fatty acids with glycerin or polyglycerin. The actinic radiation-curable inkjet ink may contain merely one of, or two or more of these (poly)glycerin fatty acid esters.

A content of the nucleating agent is 1.00 parts by weight or more and 50.00 parts by weight or less, and more preferably 1 part by weight or more and 30 parts by weight or less with respect to 100 parts by weight of the gelling agent. If the content of the nucleating agent is 1.0 part by weight or more with respect to 100 parts by weight of the gelling agent, the gelling agent can easily form the fine crystals with the nucleating agent used as a nucleus. On the other hand, if the content of the nucleating agent is 50 parts by weight or less with respect to 100 parts by weight of the gelling agent, the nucleating agent is difficult to precipitate on the surface of a cured product (an image) of the ink.

(Other Components)

The actinic radiation-curable inkjet ink may further contain, in addition to the above-described components, other components such as a cationic polymerizable compound, a photoacid generator, a colorant, a dispersant, a polymerization inhibitor, and a surfactant. The actinic radiation-curable inkjet ink may contain merely one of, or two or more of these components.

Examples of the cationic polymerizable compound include an epoxy compound, a vinyl ether compound and an oxetane compound.

Examples of the epoxy compound include: monofunctional epoxy compounds such as allyl glycidyl ether, 2-ehtylhexyl glycidyl ether, phenol(polyethyleneoxy) 5-glycidyl ether, butylphenyl glycidyl ether, glycidyl hexahydrophthalate, lauryl glycidyl ether, 1,2-epoxycyclohexane, 1,4-epoxycyclohexane, 1,2-epoxy-4-vinylcyclohexane, and norbornene oxide; difunctional epoxy compounds such as 1,2:8,9 diepoxylimonene, neopentyl glycol diglycidyl ether, and 1,6-hexanediol diglycidyl ether; and tri- or higher-functional epoxy compounds such as polyglycerol triglycidyl ether, sorbitol polyglycidyl ether, and pentaerythritol polyglycidyl ether.

Examples of the vinyl ether compound include: monofunctional vinyl ether compounds such as butyl vinyl ether, butyl propenyl ether, butyl butenyl ether, hexyl vinyl ether, ethylhexyl vinyl ether, phenyl vinyl ether, benzyl vinyl ether, ethyl ethoxy vinyl ether, acetyl ethoxy ethoxy vinyl ether, cyclohexyl vinyl ether, and adamantyl vinyl ether; difunctional vinyl ether compounds such as ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, neopentyl glycol divinyl ether, cyclohexanediol divinyl ether, cyclohexanedimethanol divinyl ether, norbornyl dimethanol divinyl ether, isovinyl divinyl ether, divinyl resorcin, and divinyl hydroquinone; and tri- or higher-functional vinyl ether compounds such as glycerin trivinyl ether, glycerin ethylene oxide adduct trivinyl ether (number of moles of ethylene oxide added: 6), trimethylolpropane trivinyl ether, trivinyl ether ethylene oxide adduct trivinyl ether (number of moles of ethylene oxide added: 3), pentaerythritol trivinyl ether, ditrimethylolpropane hexavinyl ether, and oxyethylene adducts of these.

Examples of the oxetane compound include: monofunctional oxetane compounds such as 2-(3-oxetanyl)-1-butanol, 3-(2-(2-ethylhexyloxyethyl)-3-ethyloxetane, and 3-(2-phenoxyethyl)-3-ethyloxetane; and polyfunctional oxetane compounds such as xylylenebisoxetane, and 3,3'-(oxybis methylene)bis(3-ethyloxetane).

As the photoacid generator, a compound used for a chemically amplified photoresist or photo-cationic polymerization is used (see "Organic Materials for Imaging", edited by The Japanese Research Association for Organic Electronics Materials, published by Bunshin-Publishing (1993), pp. 187-192).

The colorant may be either a dye or a pigment, and from the viewpoint of forming an image having good weather resistance, the colorant is preferably a pigment. The pigment can be selected, in accordance with the color or the like of an image to be formed, for example, from yellow pigments, red or magenta pigments, blue or cyan pigments and black pigments.

Examples of the dispersant include a hydroxyl group-containing carboxylate, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a high molecular weight copolymer, a modified polyurethane, a modified polyacrylate, a polyether ester type anionic activator, a naphthalenesulfonic acid formalin condensate salt, an aromatic sulfonic acid formalin condensate salt, a polyoxyethylene alkyl phosphate ester, a polyoxyethylene nonylphenyl ether, and stearyl amine acetate.

A content of the dispersant can be, for example, 20 mass % or more and 70 mass % or less with respect to the total mass of the pigment.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

Examples of the surfactant include: anionic surfactants such as dialkyl sulfosuccinates, alkyl naphthalenesulfonates, and fatty acid salts; nonionic surfactants such as polyoxyethylene alkyl ethers, polyoxyethylene allyl ethers, acetylene glycols, and polyoxyethylene-polyoxypropylene block copolymers; cationic surfactants such as alkyl amine salts, and quaternary ammonium salts; and silicone-based or fluorine-based surfactants.

Examples of a commercially available product of the silicone-based surfactants include KF-351A, KF-352A, KF-642 and X-22-4272, manufactured by Shin-Etsu Chemical Co., Ltd., BYK307, BYK345, BYK347 and BYK348, manufactured by BYK Japan KK ("BYK" being their registered trademark), and TSF4452, manufactured Toshiba Silicone Co., Ltd.

A content of the surfactant is preferably 0.001 mass % or more and less than 1.0 mass % with respect to the total mass of the actinic radiation-curable inkjet ink.

(Physical Properties of Actinic Radiation-curable Inkjet Ink)

From the viewpoint of further increasing the discharging property, from an inkjet head, of the actinic radiation-curable inkjet ink, the actinic radiation-curable inkjet ink has a viscosity at 80° C. of preferably 3 mPa·s or more and 20 mPa·s or less. Besides, from the viewpoint of sufficiently gelling the actinic radiation-curable inkjet ink having landed to be cooled to normal temperature, the actinic radiation-curable inkjet ink has a viscosity at 25° of preferably 1,000 mPa·s or more.

The gelling temperature of the actinic radiation-curable inkjet ink is preferably 40° C. or more and less than 100° C. If the gelling temperature is 40° C. or more, the actinic radiation-curable inkjet ink rapidly undergoes gelation after landing on a recording medium, and hence the pinning property is further increased. If the gelling temperature of the actinic radiation-curable inkjet ink is less than 100° C., the actinic radiation-curable inkjet ink caused to undergo gelation by heating can be discharged from the inkjet head, and hence the ink can be more stably discharged. From the viewpoint of reducing the load on an image forming apparatus by making the ink dischargeable at a lower temperature, the gelling temperature of the actinic radiation-curable inkjet ink is more preferably 40° C. or more and less than 70° C.

The viscosity at 80° C., the viscosity at 25° C. and the gelling temperature of the actinic radiation-curable inkjet ink can be obtained by measuring, with a rheometer, change, with temperature, of dynamic viscoelasticity of the actinic radiation-curable inkjet ink. In the present invention, these viscosities and the gelling temperature are obtained by the following methods: The actinic radiation-curable inkjet ink is heated to 100° C., and with its viscosity measured with a stress-controlled rheometer, Physica MCR301 (diameter of cone plate: 75 mm, cone angle:)1.0°, manufactured by Anton Paar, the ink is cooled to 20° C. under conditions of a shear rate of 11.7 (Fs) and a cooling rate of 0.1° C/s, and thus, a viscosity-temperature curve is obtained. The viscosity at 80° C. and the viscosity at 25° C. can be obtained by reading viscosities at 80° C. and 25° C. on the viscosity-temperature curve. The gelling temperature can be obtained as a temperature at which the viscosity is 200 mPa·s on the viscosity-temperature curve.

If the actinic radiation-curable inkjet ink contains the pigment, an average particle size of a pigment particle is preferably 0.08 µm or more and to 0.5 µm or less, and a maximum particle size thereof is preferably 0.3 µm or more and 10 µm or less from the viewpoint of further improving the discharging property from an inkjet head. An average particle size of a pigment particle herein means a value obtained by a dynamic light scattering method using Zetasizer Nano ZSP, manufactured by Malvern Instruments Ltd. Incidentally, since an actinic radiation-curable inkjet ink containing a colorant has such a high density that light is not transmitted therethrough in using this measuring apparatus, the ink is diluted 200 times before the measurement. A measurement temperature is set to normal temperature (25° C.).

(Method for Preparing Actinic Radiation-curable Inkjet Ink)

The actinic radiation-curable inkjet ink can be prepared by mixing the radical polymerizable compound, the photopolymerization initiator, the gelling agent and the nucleating agent, and optional other components under heating. The thus obtained mixture is preferably filtered through a prescribed filter. Besides, for preparing an actinic radiation-curable inkjet ink containing a pigment and a dispersant, a pigment dispersion in which the pigment and the dispersant are dispersed in a radical polymerizable compound or the like is prepared in advance, and the other components may be mixed with this dispersion under heating.

The pigment and the dispersant can be dispersed by using, for example, a ball mill, a sand mill, an attritor, a roll mill, an agitator, a Henschel mixer, a colloid mill, an ultrasonic homogenizer, a pearl mill, a wet jet mill, or a paint shaker.

2. Second Step

In this step, a droplet of the actinic radiation-curable inkjet ink is discharged from a nozzle of an inkjet head to cause the droplet to land on a recording medium.

The inkjet head may employ either of a drop-on-demand method or a continuous method. Examples of an inkjet head employing the drop-on-demand method include inkjet heads of an electrical/mechanical conversion system such as a single cavity type, a double cavity type, a vendor type, a piston type, a share mode type and a shared wall type, and inkjet heads of an electrical/thermal conversion system such as a thermal inkjet type and a bubble-jet type ("bubble-jet" being a registered trademark of Canon Inc.). Besides, the inkjet head may employ either of a scanning method or a line method.

Here, discharge stability of the actinic radiation-curable inkjet ink can be increased by discharging, from the inkjet head, the actinic radiation-curable inkjet ink having been heated. The temperature of the actinic radiation-curable inkjet ink when discharged from the inkjet head is preferably 35° C. or more and 100° C. or less, and for further increasing the discharge stability, is more preferably 35° C. or more and 80° C. or less. In particular, the actinic radiation-curable inkjet ink is discharged preferably at an ink temperature at which its viscosity is 7 mPa·s or more and 15 mPa·s or less, and more preferably 8 mPa·s or more and 13 mPa·s or less.

In order to increase the discharging property of the actinic radiation-curable inkjet ink from the inkjet head, the temperature of the actinic radiation-curable inkjet ink when filled in the inkjet head is preferably set to a temperature equal to or higher than the gelling temperature +10° C. and equal to or lower than the gelling temperature +30° C. If the ink temperature within the inkjet head is lower than the gelling temperature +10° C., the actinic radiation-curable inkjet ink undergoes gelation within the inkjet head or on a surface of the nozzle, and hence the discharging property of the actinic radiation-curable inkjet ink is easily degraded. On the other hand, if the ink temperature within the inkjet head exceeds the gelling temperature +30° C., the temperature of the actinic radiation-curable inkjet ink is so high that the ink components may be degraded.

The amount of droplets in discharging the actinic radiation-curable inkjet ink is preferably 2 pL or more and 20 pL or less from the viewpoint of a recording rate and image quality.

The recording medium on which the actinic radiation-curable inkjet ink is caused to land is not especially limited. Examples of the recording medium include absorbent media including various coated paper such as art paper, coated paper, lightweight coated paper, fine coated paper, cast coated paper, and cardboard, and uncoated paper; non-absorbent media (plastic substrates) made of plastics such as polyester, polyvinyl chloride, polyethylene, polyurethane, polypropylene, acrylic resins, polycarbonate, polystyrene, an acrylonitrile-butadiene-styrene copolymer, polyethylene terephthalate, and polybutadiene terephthalate; and non-absorbent inorganic recording media such as metals and glass.

Besides, a temperature of the recording medium on which the actinic radiation-curable inkjet ink is caused to land is preferably 40° C. or less, more preferably 35° C. or less, and further preferably 25° C. or less from the viewpoint of sufficiently crystallizing the gelling agent.

3. Third Step

In this step, the actinic radiation-curable inkjet ink having been caused to land on the recording medium is irradiated with the actinic radiation to cure the actinic radiation-curable inkjet ink. At this point, an oxygen concentration in an atmosphere where irradiation with the actinic radiation is conducted is set to less than 20 vol %. From the viewpoint of suppressing the inhibition by oxygen, the oxygen concentration in the atmosphere where irradiation with the actinic radiation is conducted is preferably 0.1 vol % or more and 15 vol % or less, and more preferably 5 vol % or more and 15 vol % or less.

A method for conducting irradiation with the actinic radiation while the oxygen concentration is set to the above-described range is not especially limited. For example, an image forming apparatus described later or the like may be used to conduct irradiation with the actinic radiation while an inert gas such as a nitrogen gas is blown against the recording medium and a droplet of the actinic radiation-curable inkjet ink. Alternatively, a space having a lowered oxygen concentration and partitioned by a partition wall or the like may be prepared in an image forming apparatus, and a droplet of the actinic radiation-curable inkjet ink may be irradiated with the actinic radiation in this space. In general, if the actinic radiation-curable inkjet ink is cured while an inert gas is blown, the unevenness in oxygen concentration is easily caused, and hence the glossiness unevenness is liable to be conspicuous. On the contrary, in the image forming method of the present invention, even if the actinic radiation-curable inkjet ink is cured in such an environment, the crystal unevenness is difficult to occur in the gelling agent as described above, and therefore, the glossiness unevenness is not liable to be conspicuous in an image to be formed.

Here, the timing of irradiating, with the actinic radiation, the actinic radiation-curable inkjet ink having been caused to land on the recording medium is not especially limited, and in general, irradiation with the actinic radiation is conducted preferably within 0.001 seconds or more and 2.0 seconds or less after the landing of the ink on the recording medium, and from the viewpoint of forming a high resolution image, more preferably within 0.001 seconds or more and 1.0 second or less.

Examples of the actinic radiation used for irradiating a droplet of the actinic radiation-curable inkjet ink having landed on the recording medium include electron beams, ultraviolet rays, $\alpha$-rays, $\gamma$-rays and X-rays. Among these, ultraviolet rays are preferably used from the viewpoint of easy handleability and small influence on a human body. From the viewpoint of suppressing occurrence of ink curing failure caused because the radiation-curable inkjet ink is melted by radiant heat of a light source, the light source is preferably a light emitting diode (LED). Examples of an LED light source capable of conducting irradiation with the actinic radiation for curing the actinic radiation-curable inkjet ink include water-cooled LEDs of 395 nm, manufactured by Phoseon Technology Inc., Heraeus, Kyocera Corporation, HOYA Corporation, and Integration Technology Co., Ltd.

Besides, the light amount of the actinic radiation to be irradiated is preferably 200 mJ/cm$^2$ or more and 1,000 mJ/cm$^2$ or less. If the light amount is 200 mJ/cm$^2$ or more, the radical polymerizable compound can be sufficiently polymerized to sufficiently increase the hardness of an image (a cured product) to be obtained. On the other hand, if the light amount is excessive, the gelling agent may be dissolved again to degrade the pinning property, but if the light amount is 1,000 mJ/cm$^2$ or less, such degradation in pinning property is difficult to occur. From this point of view, the amount of the actinic radiation to be irradiated is more preferably 300 mJ/cm$^2$ or more and 800 mJ/cm$^2$ or less, and further preferably 350 mJ/cm$^2$ or more and 500 mJ/cm$^2$ or less.

Here, the image forming method of the present invention can be performed by using, for example, image forming apparatus 100 including oxygen concentration adjusting section 140 as illustrated in FIG. 1. Image forming apparatus 100 includes inkjet head 110, conveying section 120, irradiating section 130, and oxygen concentration adjusting section 140.

In image forming apparatus 100, while recording medium 200 is being conveyed by conveying section 120, actinic radiation-curable inkjet ink 111 is caused to land on recording medium 200 by inkjet head 110. Subsequently, while an oxygen concentration in an atmosphere where irradiation with the actinic radiation is conducted is being adjusted by oxygen concentration adjusting section 140, a droplet of the actinic radiation-curable inkjet ink is cured by irradiation with the actinic radiation by irradiating section 130.

Oxygen concentration adjusting section 140 can employ a structure including, for example, exhaust pipe 141 that is connected to an external exhaust apparatus and is capable of suctioning and exhausting a gas present in the vicinity of the surface of the recording medium, and supply pipe 142 that is connected to an apparatus generating a gas having a low oxygen concentration, such as a nitrogen gas generator, capable of supplying the gas having a low oxygen concentration to the vicinity of the surface of the recording medium, and disposed on the downstream side of exhaust pipe 141. In this case, the oxygen concentration in the atmosphere where irradiation with the actinic radiation is conducted can be set to be less than 20 vol % by adjusting the amount of the gas exhausted through exhaust pipe 141 and the amount of the gas supplied through supply pipe 142. Although exhaust pipe 141 and supply pipe 142 are illustrated to be continuous in FIG. 1, these pipes can be away from each other as long as the oxygen concentration can be adjusted. Besides, supply pipe 142 is disposed preferably in the vicinity of irradiating section 130, and may be disposed continuously with irradiating section 130.

Figure 2:
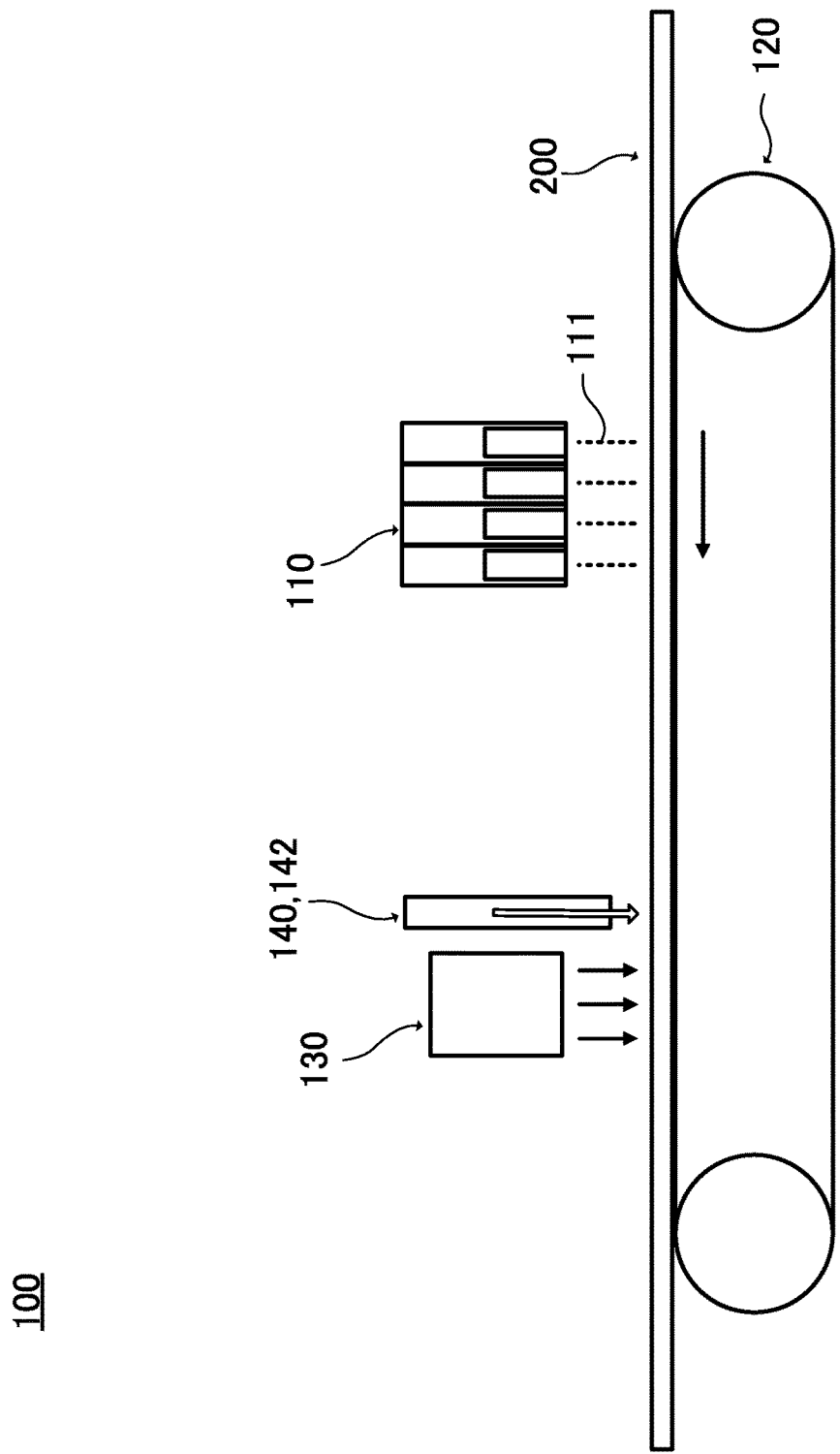
FIG. 2 is a side view illustrating another example of the image forming apparatus to be used for performing the image forming method of the present invention.

Alternatively, as illustrated in FIG. 2, oxygen concentration adjusting section 140 may employ a structure not including exhaust pipe 141 but including supply pipe 142 alone as long as the oxygen concentration in the atmosphere where irradiation with the actinic radiation is conducted can be set to be less than 20 vol %. In FIG. 2, like reference numerals are used to refer to like elements illustrated in FIG. 1.

According to the image forming method of the present invention, an image having small glossiness unevenness and having good surface curability can be formed. Accordingly, the method is applicable to formation of various images.

Although embodiments of the present invention have been described and illustrated in detail, it is clearly understood that the same is by way of illustration and example only and not limitation, the scope of the present invention should be interpreted by terms of the appended claims.

EXAMPLES

Specific examples of the present invention will now be described. It is noted that these examples do not intend to limit the scope of the present invention.

1. Preparation of Actinic Radiation-curable Inkjet Ink 1-1. Preparation of Pigment Dispersion A stainless steel beaker was charged with 9 parts by weight of a dispersant (Ajisper PB824 (manufactured by Ajinomoto Fine-Techno Co., Inc.)), 70 parts by weight of a radical polymerizable compound (APG-200 (tripropylene glycol diacrylate, manufactured by Shin-Nakamura Chemical Co., Ltd.)), and 0.02 parts by weight of a polymerization inhibitor (Irgastab UV10 (manufactured by Ciba Japan, "Irgastab" being their registered trademark), and the resultant was stirred for 1 hour with heating on a hot plate at 65° C. to dissolve the dispersant and the like. The thus obtained solution was cooled to room temperature, and 20.98 parts by weight of a pigment (Chromofine Red 6112JC (Pigment Red 122, manufactured by Dainichiseika Color & Chemicals Mfg. Co., Ltd., "Chromofine" being their registered trademark)) was added thereto. The resultant solution was put in a glass bottle together with 200 g of zirconia beads having a diameter of 0.5 mm, and the glass bottle was tightly sealed and subjected to a dispersion treatment with a paint shaker for 6 hours until a desired particle size was obtained. After the dispersion treatment, the zirconia beads were removed to obtain a pigment dispersion.

1-2. Preparation of Actinic Radiation-curable Inkjet Ink

In accordance with ink components shown in Tables 1 to 4 below, the above-described pigment dispersion was mixed with the following components, and the resultant was heated to 80° C. and stirred. The thus obtained solution was filtered, with heating, through a Teflon (R) #3000 metal filter manufactured by ADVANTEC Co., Ltd. to obtain each of inks according to Examples 1 to 20 and Comparative Examples 1 to 17.

Materials of Ink (Radical Polymerizable Compound (Actinic Radiation-curable Compound)

A-400 (Polyethylene glycol #400 diacrylate, manufactured by Shin-Nakamura Chemical Co., Ltd.)

SR494 (4EO-Modified pentaerythritol tetraacrylate, manufactured by SARTOMER)

SR499 (6EO-Modified trimethylolpropane triacrylate, manufactured by SARTOMER)

(Polymerization Inhibitor)

Irgastab UV10 (manufactured by Ciba Japan, "Irgastab" being their registered trademark)

(Photopolymerization Initiator)

DAROCURE TPO (manufactured by Ciba Japan, "DAROCURE" being their registered trademark)

Speedcure ITX (manufactured by Lambson Limited)

(Photopolymerization Initiator Auxiliary Agent)

Speedcure EDB (amine-based auxiliary agent, manufactured by Lambson Limited)

(Gelling Agent)

Stearone (the number of carbon atoms of straight chain alkyl group: 17-17)

Behenyl behenate (the number of carbon atoms of straight chain alkyl group: 21-22)

(Nucleating Agent)

Tetraglycerin tristearate (the number of carbon atoms of straight chain alkyl group: 17)

Hexaglycerin tristearate (the number of carbon atoms of straight chain alkyl group: 17)

Decaglycerin monostearate (the number of carbon atoms of straight chain alkyl group: 17)

Decaglyceryl monomyristate (the number of carbon atoms of straight chain alkyl group: 13)

Polyethylene glycol monostearate

Stearyl alcohol

2. Formation of Image

Each of the actinic radiation-curable inkjet inks of Examples and Comparative Examples was used to form an image using image forming apparatus 100 of FIG. 2. First, the actinic radiation-curable inkjet ink was filled in an ink discharging section (a line-type inkjet recording apparatus), so as to be discharged from inkjet head 100 onto recording medium 200. At this point, the temperature of inkjet head 100 of the ink discharging section was set to 80° C., and the temperature of recording medium 200 (Mari Coat, basis weight: 550 g/m$^2$, thickness: 0.68 mm, manufactured by Hokuetsu Kishu Paper Co., Ltd.) was set to 35° C. Besides, a printing area was set to 5 cm×5 cm or 16 cm×4 cm.

As inkjet head 110, a piezo head having a nozzle diameter of 20 μm and including 512 nozzles (in two rows each of 256 nozzles, arranged in a zigzag manner, nozzle pitch in each row: 360 dpi) was used. The discharging was performed under discharging conditions of an amount of every droplet of 2.5 pl, a droplet rate of about 6 m/s, and resolution of 1,440 dpi×1,440 dpi. The recording rate was set to 500 mm/s. The formation of the image was carried out under an environment of 23° C. and 55% RH. It is noted that the term "dpi" refers to the number of dots per 2.54 cm.

After the printing, the droplets of the actinic radiation-curable inkjet inks having been caused to land on recording medium 200 were cured by irradiation with ultraviolet rays. The irradiation with ultraviolet rays was performed using irradiating section 130 (an LED lamp (manufactured by Phoseon Technology Inc., irradiation wavelength: 395 nm, water-cooled LED)) disposed downstream of inkjet head 110. Besides, the oxygen concentration was adjusted by oxygen concentration adjusting section 140. Specifically, a nitrogen (N2) gas was blown toward recording medium 200 from supply pipe 142 (a gas supply nozzle) disposed between inkjet head 110 and irradiating section 130, and thus, the oxygen concentration on the surface of the droplet was adjusted. Incidentally, the oxygen concentration in a region where the actinic radiation was irradiated was measured with an oxygen concentration meter (manufactured by Tietech Co., Ltd., Fibox 3) provided to have the tip of a sensor thereof disposed between an LED light source unit and the recording medium. Besides, in accordance with the oxygen concentration, the flow rate of the nitrogen gas was appropriately controlled.

3. Evaluation

The surface curability and the glossiness of each image formed in the above-described manner were evaluated by the following methods. The results are shown in Tables 1 to 4.

(Surface Curability)

The surface curability of the printed image was evaluated by touching, with a finger, the solid image obtained as described above, and sliding abrasion (color migration) was evaluated, in accordance with a method described in "JIS K5701-1 6.2.3 Abrasion Resistance Test", by placing, on the solid image, art paper for printing (Tokubishi Art, basis weight: 104.7 g/m$^2$, manufactured by Mitsubishi Paper Mills Ltd.) cut into a size of 2 cm$^2$ to be rubbed together under a load of 800 g, so as to visually observe the extent of color migration to the coated paper for printing.

A: Color migration was not caused, and the surface was not sticky.

B: Color migration was slightly caused, but the surface was not sticky.

C: Color migration was slightly caused, and the surface was rather sticky.

D: Color migration was caused, and the surface was sticky.

(Glossiness/Granularity)

In each of the solid images of the size of 5 cm x 5 cm printed under the aforementioned conditions, variation in the glossiness and occurrence of granularity in the cured film were visually checked under the respective conditions.

A: The glossiness was even, and the granularity was low.

B: The glossiness was slightly uneven, but the granularity was low.

C: The glossiness was uneven, but the granularity was low.

D: The glossiness was uneven, and the granularity was high.

TABLE 1

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Actinic radiation-curable compound | A-400 | 32.98 | 32.98 | 32.98 | 32.98 | 32.98 | 32.98 | 32.98 | 32.98 | 32.0 | 32.0 | 32.0 | 32.0 |
| | SR494 | 17.0 | 17.0 | 17.0 | 17.0 | 17.0 | 17.0 | 17.0 | 17.0 | 17.0 | 17.0 | 17.0 | 17.0 |
| | SR499 | 17.9 | 17.9 | 17.9 | 17.9 | 17.9 | 17.9 | 17.9 | 17.9 | 17.9 | 17.9 | 17.9 | 17.9 |
| Polymerization inhibitor | Irgastab UV10 | 0.1 | 0.1 | 0.1 | 0.1 | 0.1 | 0.1 | 0.1 | 0.1 | 0.1 | 0.1 | 0.1 | 0.1 |
| Photo-polymerization initiator | DAROCURE TPO | 6.0 | 6.0 | 6.0 | 6.0 | 6.0 | 6.0 | 6.0 | 6.0 | 6.0 | 6.0 | 6.0 | 6.0 |
| | Speedcure ITX | 2.0 | 2.0 | 2.0 | 2.0 | 2.0 | 2.0 | 2.0 | 2.0 | 2.0 | 2.0 | 2.0 | 2.0 |
| Photo-polymerization initiator auxiliary agent | Speedcure EDB | 3.0 | 3.0 | 3.0 | 3.0 | 3.0 | 3.0 | 3.0 | 3.0 | 3.0 | 3.0 | 3.0 | 3.0 |
| Pigment dispersion | | 19.0 | 19.0 | 19.0 | 19.0 | 19.0 | 19.0 | 19.0 | 19.0 | 19.0 | 19.0 | 19.0 | 19.0 |
| Gelling agent | Stearone (carbon number on straight chain alkyl: 17-17) | 1.00 | 1.00 | 1.00 | 1.00 | 1.00 | 1.00 | 1.00 | 1.00 | 1.00 | 1.00 | 1.00 | 1.00 |
| | Behenyl behenate (carbon number on straight chain alkyl: 21-22) | 1.00 | 1.00 | 1.00 | 1.00 | 1.00 | 1.00 | 1.00 | 1.00 | 1.00 | 1.00 | 1.00 | 1.00 |
| Nucleating Agent | Tetraglycerin tristearate (carbon number on straight chain alkyl group: 17) | 0.02 | | | | 0.02 | | | | 1.00 | | | |
| | Hexaglycerin tristearate (carbon number on straight chain alkyl group: 17) | | 0.02 | | | | 0.02 | | | | 1.00 | | |
| | Decaglycerin monostearate (carbon number on straight chain alkyl group: 17) | | | 0.02 | | | | 0.02 | | | | 1.00 | |
| | Decaglyceryl monomyristate (carbon number on straight chain alkyl group: 13) | | | | 0.02 | | | | 0.02 | | | | 1.00 |
| | Polyethylene | | | | | | | | | | | | |

TABLE 1-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| glycol monostearate Stearyl alcohol |  |  |  |  |  |  |  |  |  |  |  |  |
| Amount of nucleating agent with respect to 100 parts by weight of gelling agent | 1.0 | 1.0 | 1.0 | 1.0 | 1.0 | 1.0 | 1.0 | 1.0 | 50.0 | 50.0 | 50.0 | 50.0 |
| Oxygen concentration (vol %) on droplet surface at the time of irradiation with actinic radiation | 5.00% | 5.00% | 5.00% | 5.00% | 10.00% | 10.00% | 10.00% | 10.00% | 5.00% | 5.00% | 5.00% | 5.00% |
| Surface curability | A | A | A | A | B | B | B | A | B | B | B | B |
| Evaluation of glossiness/granularity | B | B | B | C | A | A | B | C | B | B | B | C |

TABLE 2

|  |  | Example 13 | Example 14 | Example 15 | Example 16 | Example 17 | Example 18 | Example 19 | Example 20 |
|---|---|---|---|---|---|---|---|---|---|
| Actinic radiation-curable compound | A-400 | 32.0 | 32.0 | 32.0 | 32.0 | 31.8 | 31.8 | 31.8 | 31.8 |
|  | SR494 | 17.0 | 17.0 | 17.0 | 17.0 | 17.0 | 17.0 | 17.0 | 17.0 |
|  | SR499 | 17.9 | 17.9 | 17.9 | 17.9 | 17.9 | 17.9 | 17.9 | 17.9 |
| Polymerization inhibitor | Irgastab UV10 | 0.1 | 0.1 | 0.1 | 0.1 | 0.1 | 0.1 | 0.1 | 0.1 |
| Photopolymerization initiator | DAROCURE TPO | 6.0 | 6.0 | 6.0 | 6.0 | 6.0 | 6.0 | 6.0 | 6.0 |
|  | Speedcure ITX | 2.0 | 2.0 | 2.0 | 2.0 | 2.0 | 2.0 | 2.0 | 2.0 |
| Photopolymerization initiator auxiliary agent | Speedcure EDB | 3.0 | 3.0 | 3.0 | 3.0 | 3.0 | 3.0 | 3.0 | 3.0 |
| Pigment dispersion |  | 19.0 | 19.0 | 19.0 | 19.0 | 19.0 | 19.0 | 19.0 | 19.0 |
| Gelling agent | Stearone (carbon number on straight chain alkyl: 17-17) | 1.00 | 1.00 | 1.00 | 1.00 | 1.00 | 1.00 | 1.00 | 1.00 |
|  | Behenyl behenate (carbon number on straight chain alkyl: 21-22) | 1.00 | 1.00 | 1.00 | 1.00 | 1.00 | 1.00 | 1.00 | 1.00 |
| Nucleating Agent | Tetraglycerin tristearate (carbon number on straight chain alkyl group: 17) | 1.00 |  |  |  | 1.20 |  |  |  |
|  | Hexaglycerin tristearate (carbon number on straight chain alkyl group: 17) |  | 1.00 |  |  |  | 1.20 |  |  |
|  | Decaglycerin monostearate (carbon number on straight chain alkyl group: 17) |  |  | 1.00 |  |  |  | 1.20 |  |
|  | Decaglyceryl monomyristate (carbon number on straight chain alkyl group: 13) |  |  |  | 1.00 |  |  |  | 1.20 |
|  | Polyethylene glycol monostearate Stearyl alcohol |  |  |  |  |  |  |  |  |
| Amount of nucleating agent with respect to 100 parts by weight of gelling agent |  | 50.0 | 50.0 | 50.0 | 50.0 | 60.0 | 60.0 | 60.0 | 60.0 |
| Oxygen concentration (vol %) on droplet surface at the time of irradiation with actinic radiation |  | 10.00% | 10.00% | 10.00% | 10.00% | 5.00% | 5.00% | 5.00% | 5.00% |
| Surface curability |  | B | B | B | B | B | B | B | B |
| Evaluation of glossiness/granularity |  | A | A | B | C | B | B | B | C |

TABLE 3

|  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Actinic radiation-curable compound | A-400 | 32.98 | 32.98 | 32.98 | 32.98 | 32.0 | 32.0 | 32.0 | 32.0 |
|  | SR494 | 17.0 | 17.0 | 17.0 | 17.0 | 17.0 | 17.0 | 17.0 | 17.0 |
|  | SR499 | 17.9 | 17.9 | 17.9 | 17.9 | 17.9 | 17.9 | 17.9 | 17.9 |

TABLE 3-continued

|  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Polymerization inhibitor | Irgastab UV10 | 0.1 | 0.1 | 0.1 | 0.1 | 0.1 | 0.1 | 0.1 | 0.1 |
| Photopolymerization initiator | DAROCURE TPO | 6.0 | 6.0 | 6.0 | 6.0 | 6.0 | 6.0 | 6.0 | 6.0 |
|  | Speedcure ITX | 2.0 | 2.0 | 2.0 | 2.0 | 2.0 | 2.0 | 2.0 | 2.0 |
| Photopolymerization initiator auxiliary agent | Speedcure EDB | 3.0 | 3.0 | 3.0 | 3.0 | 3.0 | 3.0 | 3.0 | 3.0 |
| Pigment dispersion |  | 19.0 | 19.0 | 19.0 | 19.0 | 19.0 | 19.0 | 19.0 | 19.0 |
| Gelling agent | Stearone (carbon number on straight chain alkyl: 17-17) | 1.00 | 1.00 | 1.00 | 1.00 | 1.00 | 1.00 | 1.00 | 1.00 |
|  | Behenyl behenate (carbon number on straight chain alkyl: 21-22) | 1.00 | 1.00 | 1.00 | 1.00 | 1.00 | 1.00 | 1.00 | 1.00 |
| Nucleating Agent | Tetraglycerin tristearate (carbon number on straight chain alkyl group: 17) |  |  |  |  |  |  |  |  |
|  | Hexaglycerin tristearate (carbon number on straight chain alkyl group: 17) |  |  |  |  |  |  |  |  |
|  | Decaglycerin monostearate (carbon number on straight chain alkyl group: 17) |  |  |  |  |  |  |  |  |
|  | Decaglyceryl monomyristate (carbon number on straight chain alkyl group: 13) |  |  |  |  |  |  |  |  |
|  | Polyethylene glycol monostearate | 0.02 |  | 0.02 |  | 1.00 |  | 1.00 |  |
|  | Stearyl alcohol |  | 0.02 |  | 0.02 |  | 1.00 |  | 1.00 |
| Amount of nucleating agent with respect to 100 parts by weight of gelling agent |  | 1.0 | 1.0 | 1.0 | 1.0 | 50.0 | 50.0 | 50.0 | 50.0 |
| Oxygen concentration (vol %) on droplet surface at the time of irradiation with actinic radiation |  | 5.00% | 5.00% | 10.00% | 10.00% | 5.00% | 5.00% | 10.00% | 10.00% |
| Surface curability |  | A | A | B | B | B | B | B | B |
| Evaluation of glossiness/granularity |  | D | D | D | D | D | D | D | D |

TABLE 4

|  |  | Comparative example 9 | Comparative example 10 | Comparative example 11 | Comparative example 12 | Comparative example 13 | Comparative example 14 | Comparative example 15 | Comparative example 16 | Comparative example 17 |
|---|---|---|---|---|---|---|---|---|---|---|
| Actinic radiation-curable compound | A-400 | 32.98 | 32.98 | 32.0 | 32.0 | 32.0 | 33.0 | 33.0 | 33.0 | 32.98 |
|  | SR494 | 17.0 | 17.0 | 17.0 | 17.0 | 17.0 | 17.0 | 17.0 | 17.0 | 17.0 |
|  | SR499 | 17.9 | 17.9 | 17.9 | 17.9 | 17.9 | 17.9 | 17.9 | 17.9 | 17.9 |
| Polymerization inhibitor | Irgastab UV10 | 0.1 | 0.1 | 0.1 | 0.1 | 0.1 | 0.1 | 0.1 | 0.1 | 0.1 |
| Photopolymerization initiator | DAROCURE TPO | 6.0 | 6.0 | 6.0 | 6.0 | 6.0 | 6.0 | 6.0 | 6.0 | 6.0 |
|  | Speedcure ITX | 2.0 | 2.0 | 2.0 | 2.0 | 2.0 | 2.0 | 2.0 | 2.0 | 2.0 |
| Photopolymerization initiator auxiliary agent | Speedcure EDB | 3.0 | 3.0 | 3.0 | 3.0 | 3.0 | 3.0 | 3.0 | 3.0 | 3.0 |
| Pigment dispersion |  | 19.0 | 19.0 | 19.0 | 19.0 | 19.0 | 19.0 | 19.0 | 19.0 | 19.0 |
| Gelling agent | Stearone (carbon number on straight chain alkyl: 17-17) | 1.00 | 1.00 | 1.00 | 1.00 | 1.00 | 1.00 | 1.00 | 1.00 | 1.00 |
|  | Behenyl behenate (carbon number on straight chain alkyl: 21-22) | 1.00 | 1.00 | 1.00 | 1.00 | 1.00 | 1.00 | 1.00 | 1.00 | 1.00 |
| Nucleating Agent | Tetraglycerin tristearate (carbon number on straight chain alkyl group: 17) | 0.02 |  |  | 1.00 |  |  |  |  |  |
|  | Hexaglycerin tristearate (carbon number on |  | 0.02 |  |  | 1.00 |  |  |  |  |

TABLE 4-continued

|  | Comparative example 9 | Comparative example 10 | Comparative example 11 | Comparative example 12 | Comparative example 13 | Comparative example 14 | Comparative example 15 | Comparative example 16 | Comparative example 17 |
|---|---|---|---|---|---|---|---|---|---|
| straight chain alkyl group: 17) |  |  |  |  |  |  |  |  |  |
| Decaglycerin monostearate (carbon number on straight chain alkyl group: 17) |  | 0.02 |  |  | 1.00 |  |  |  |  |
| Decaglyceryl monomyristate (carbon number on straight chain alkyl group: 13) |  |  |  |  |  |  |  |  |  |
| Polyethylene glycol monostearate |  |  |  |  |  |  |  |  |  |
| Stearyl alcohol |  |  |  |  |  |  |  |  |  |
| Amount of nucleating agent with respect to 100 parts by weight of gelling agent | 1.0 | 1.0 | 1.0 | 50.0 | 50.0 | 50.0 | — | — | — |
| Oxygen concentration (vol %) on droplet surface at the time of irradiation with actinic radiation | Air | Air | Air | Air | Air | Air | 5.00% | 10.00% | Air |
| Surface curability | C | C | C | D | D | D | A | B | C |
| Evaluation of glossiness/granularity | B | B | B | A | A | A | D | D | C |

As shown in Tables 1 to 4, in a case where the actinic radiation-curable inkjet ink not containing the nucleating agent was cured under an environment of an oxygen concentration at less than 20 vol % (as in Comparative Examples 15 and 16), the surface curability was evaluated as good but the glossiness/granularity was evaluated as poor as compared with a case where the actinic radiation-curable inkjet ink was cured in the air (as in Comparative Example 17). In the case where the droplet was cured under an environment of an oxygen concentration at less than 20 vol % (as in Comparative Examples 15 and 16), it is presumed that the glossiness unevenness became large because the glossiness unevenness (curing unevenness) derived from the uneven oxygen concentration and the glossiness unevenness derived from the crystal unevenness of the gelling agent were synergized with each other. Besides, it is presumed that irregularities were caused on the surface of each droplet due to the crystal unevenness of the gelling agent, and hence the granularity was increased.

On the contrary, in a case where the actinic radiation-curable inkjet ink contains the gelling agent having a polar group and a $C_{15-26}$ alkyl group, and the nucleating agent containing a (poly)glycerin fatty acid ester, even if the ink was cured under an environment of an oxygen concentration less than 20 vol %, the surface curability and the glossiness/granularity were evaluated as good (as in Examples 1 to 20). In the case where the actinic radiation-curable inkjet ink contains the gelling agent and the nucleating agent, it is presumed that the gelling agent formed uniformly fine crystals with the nucleating agent used as a nucleus. It is presumed that the crystal unevenness of the gelling agent was thus reduced, and hence, the glossiness unevenness was not liable to be conspicuous. Besides, it is presumed that since the crystals of the gelling agent became fine, irregularities are difficult to be caused on the surface of each droplet, and hence the granularity was also difficult to be caused.

Incidentally, even when the actinic radiation-curable inkjet ink contained the gelling agent and the nucleating agent, if the droplet was cured in the air, the inhibition by oxygen was caused and hence the surface curability was not sufficient (as in Comparative Examples 9 to 14).

Besides, when a compound other than the (poly)glycerin fatty acid ester was used as the nucleating agent (as in Comparative Examples 1 to 8), the glossiness unevenness was not eliminated. It is presumed that the nucleating agent other than the (poly)glycerin fatty acid ester was insufficient in the affinity with the gelling agent, and hence it was difficult to uniformly crystalize the gelling agent.

What is claimed is:

1. An image forming method, comprising:
   preparing an actinic radiation-curable inkjet ink containing a radical polymerizable compound, a photopolymerization initiator, a gelling agent, and a nucleating agent;
   discharging, from a nozzle of an inkjet head, a droplet of the actinic radiation-curable inkjet ink to cause the droplet to land on a surface of a recording medium; and
   curing the droplet by irradiating the droplet having been caused to land on the recording medium with actinic radiation, wherein the gelling agent contains, in a molecular structure thereof, a polar group, and a $C_{15-26}$ alkyl group,
   the nucleating agent is a (poly)glycerin fatty acid ester, and
   an oxygen concentration in an atmosphere where irradiation with the actinic radiation is conducted is less than 20 vol %.

2. The image forming method according to claim 1, wherein a content of the nucleating agent in the actinic radiation-curable inkjet ink is 1.00 part by weight or more and 50.00 parts by weight or less with respect to 100 parts by weight of the gelling agent.

3. The image forming method according to claim 1, wherein a difference between the number of carbon atoms in a linear portion of an alkyl chain contained in the gelling agent and the number of carbon atoms in a linear portion of an alkyl chain contained in the (poly)glycerin fatty acid ester is 2 or less.

4. The image forming method according to claim 1, wherein a nitrogen gas is blown against a surface of the droplet at the time of irradiation with the actinic radiation.

* * * * *